United States Patent

[11] 3,562,501

| [72] | Inventor | Francis C. Mears |
| | | Canoga Park, Calif. |
| [21] | Appl. No. | 558,048 |
| [22] | Filed | June 16, 1966 |
| [45] | Patented | Feb. 9, 1971 |
| [73] | Assignee | Mobil Oil Corporation |
| | | a corporation of New York |

[54] COMPUTER CONTROL OF CHROMATOGRAPHS
16 Claims, 3 Drawing Figs.

[52] U.S. Cl. ................................................ 235/151.35,
235/150; 73/23
[51] Int. Cl. ......................................................... G06f 9/00
[50] Field of Search ......................................... 235/151.35,
151.3, 151.12, 151.13; 73/23, 23.1; 23/230, 253

[56] References Cited
UNITED STATES PATENTS

| 3,049,908 | 8/1962 | Kindred et al. ............... | 73/23 |
| 3,185,820 | 5/1965 | Williams et al. ............... | 235/151.35ux |
| 3,284,616 | 11/1966 | Ernyei et al. .................. | 235/151.35x |
| 3,328,774 | 6/1967 | Louvel .......................... | 235/151.35x |
| 3,333,090 | 7/1967 | Neer............................. | 235/151.35 |
| 3,375,701 | 4/1968 | Arksey ......................... | 73/23.1 |
| 3,385,960 | 5/1968 | Buu.............................. | 235/151.35x |

*Primary Examiner*—Malcolm A. Morrison
*Assistant Examiner*—Edward J. Wise
*Attorneys*—Oswald G. Hayes, Donald L. Dickerson and Paul H. Heller

ABSTRACT: A digital computer system for controlling and monitoring chromatographic columns including detector means for providing analogue signals representative of the component peaks of the sample streams applied to each chromatographic column, and attenuating means for automatically attenuating the analogue signals in response to signals from the computer. Multiplexing means are provided for sequentially applying the analogue signals of the columns to an analogue to digital converter which, in turn, applies the digital signals to the digital computer. The system also includes means for generating a weighted slope to smooth out noise.

INVENTOR.
Francis C. Mears

INVENTOR.
Francis C. Mears
BY
Paul H. Heller
Attorney

COMPUTER CONTROL OF CHROMATOGRAPHS

This invention is directed to the use and control of chromatographs and their ancillary equipment. More particularly, this invention is directed to the computer control of online process chromatographs.

The use of chromatographs as analytical instruments has been increasing very rapidly in industry. Chromatographic columns are widely used for the separation and analysis of many chemical mixtures. Components of these mixtures are separated by differential passage over a bed of solids or liquids in a chromatographic column and are carried through the column by means of an eluting fluid. The different absorption and desorption characteristics of the components account for their differential rate of passage through the column. The emergence of the various components in the eluate may, for example, be detected by thermistor beads heated by electric current, at the exit end of the chromatograph. In this method heat is conducted away from a hot body, the bead situated in the gas, at a rate depending primarily on the thermal conductivity of the gas. These factors determine the temperature of the bead and thus its resistance, which is measured. The output of the detector is a succession of peaks or distribution curves whose area or height are approximately proportional to concentration of the components in a sample.

This technique is now finding utility in meeting the growing need for continuous onstream analyzers, particularly in the petroleum and chemical industries. However, onstream analysis requires a degree of automation which will reduce the burden of controlling these instruments and interpreting more accurately their output of analytical data.

It is therefore an object of this invention to provide a method and apparatus for the control of process chromatographs which will increase their utility as onstream analyzers.

It is a further object of this invention to provide for the use of a digital computer both to control the operation of a chromatograph and to automatically handle its output of analytical data.

Other objects of this invention will become apparent from a reading of the following descriptive matter in conjunction with the accompanying FIGS.

Briefly, this invention involves the use of a digital computer to control and monitor the chromatographic columns and detectors of several chromatographs. The computer is used to perform an online integration of peaks in the chromatogram and to operate the chromatograph through timed and sensed functions.

A chromatograph system can be broken down into two subsystems, listed below as A and B.

A

CHROMATOGRAPHIC ANALYZER AND SAMPLING SYSTEM

Temperature Controlled Housing or Heat Sink
Column or Columns
Pressure Regulators
Sample Inject and Column Switching Valves
Temperature Controller
Stream Switching Valves if a Multistream Instrument
Sampling System which prepares sample to proper temperature, pressure, and degree of cleanliness acceptable to good analyzer operation
Detector

B

CHROMATOGRAPH CONTROL AND READOUT

Timer/Programmer Initiates analysis, performs autozero, switches in proper attenuator initiates peak picker.
Auto zero mechanism
Precision power supply
Amplifier and recorder
Stream Switching mechanism
Stream identification
Attentuators
Attentuator relays
Peak Picker It is the chromatograph control and readout subsystem which is subject in this invention to computer implementation. In the area of chromatograph analyzer and sampling system all functions would remain intact except there are certain parameters (temperature regulation, pressure control, and column aging) which when using computer techniques may be less critical.

To explain the problem, reference will be made to a simplified chromatograph system. Basically, a sample of reproducible size is introduced into a carrier stream and washed through a packed column. The sample enters the column as a mixture, but as it passes down the column length the various components of the mixture travel at different rates, depending upon their respective affinities for the column material. The substance with the least affinity will travel down the column fastest and emerge more quickly than a substance with a high affinity for the column material. This sample, through the chromatographic fractionating phenomena, is broken into its pure components and these elute in a time relationship from the column into the detection block. A commonly used detection method is the thermal type using a hot wire bridge. A precision DC power source supplies sufficient current to heat the bridge elements that are in contact with the carrier and carrier plus pure components streams. Over one bridge element passes carrier and the eluted components and over the other element carrier only passes. The bridge is designed to be in balance when carrier only is passing over both elements. As a pure component elutes the bridge swings out of balance and this is the information signal which must be interpreted by the chromatograph control and readout block. This information signal is called the chromatogram, which is a plot of effluent composition vs. time. The interpretation of the chromatogram is the measurement of certain areas in order to calculate the quantity of each component. Each such area is called a peak area and is bounded by a positive or negative excursion of the signal from the baseline. The baseline forms one bound of this area and it is the time/signal plot of the bridge output.

The chromatograph control unit must perform the following functions.

Sample Inject—Initiates analysis by actuating sample valve.
Auto Zero—Balances bridge automatically to give zero output at chromatogram baseline.
Select proper attenuation factor for each component. This is necessary to keep pen on chart and to give very small concentrations a readable value on the chart.
Initiate the peak picker, pick the peak, and store signal.
Control switching valve or valves in the analyzer to determine back flush, precut, etc.
Switch in step changes of current to the column heater to speed up elution time of components, if the chromatograph is a temperature programmed type.
Provide maintenance controls for manually cycling, attentuating, etc.
Control the chart drive.

A disadvantage of the conventional techniques of chromatograph control and readout is that it received an assemblage of hardware which costs roughly one-half to two-thirds the total cost of a process chromatograph system. It is made up of relatively unreliable electrical and mechanical parts. This control assemblage must be reproduced for each chromatographic analyzer. This control equipment for each chromatograph requires space, and reduces the response of the system to the limitations on the recorder and the electromechanical timer. Furthermore, it is difficult to maintain and to calibrate. The hardware is made up of several interacting electromechanical systems, such as, timer unit, attenuator switching, peak picker, recorder. Each attenuator must be adjusted every time a standard sample is run. This can typically take 1—2 hours per instrument multiplied by the number of chromatographs. The peak height measurement, the method generally used for process chromatograph readouts, is not accurate when different streams being analyzed by the same instrument have widely different concentrations for a particular component, since concentration vs. peak height is not linear. It is sometimes necessary to give the operator different multiplying factors for the same component on different streams.

An example of a prior art device for carrying out analysis and control by chromatographic methods is shown in Kindred et al., U.S. Pat. No. 3,049,908. Kindred et al., discloses a system employing a programmer-integrator which is operatively associated with a chromatographic analyzer, a recorder controller and a control valve for controlling a process. The various functional steps in the operation of the chromatograph are controlled by a timing motor which actuates switches by means of a system of cams. An integrator circuit is also actuated by this cam system, wherein the signal from the chromatographic detector circuit is stored in a capacitor over preselected periods of time.

In the present invention all of the functions of the chromatograph control and readout hardware can be performed by an online digital computer. The result is a more accurate analysis, and greatly improved reliability. This invention comprises online integration of the chromatogram peaks and the implementation of various on/off functions by digital outputs from the computer. Integration of chromatogram peaks has the following advantages over peak height measurement: linear relationship of concentration area; less sensitive to column temperature change; do not need a sharp peak for detection; less sensitive to column aging and peak spreading; and standardization is simplified and in some cases due defined and reproducible relative thermal response factors.

The relative thermal response of a particular component to some standard component is described in detail in an article by A. E. Messner, D. M. Rosie, and P. A. Argabright, Analytical Chemistry, pp. 230—233, Vol. 31, No. 2, Feb. 1959. Another discussion of relative thermal response of pure components in a chromatographic detector is found in Gas-Liquid Chromatography, S. Dal Hogare, R. S. Juves, Interscience Publishers, Div. of J. Wiley and Sons, 1962.

Online integration utilizing a computer can have the further advantage of speeding up analyses because the system is no longer tied to recorder response time.

The attached FIG. 1 is an illustration of the basic building blocks used in the invention.

Figure 1:
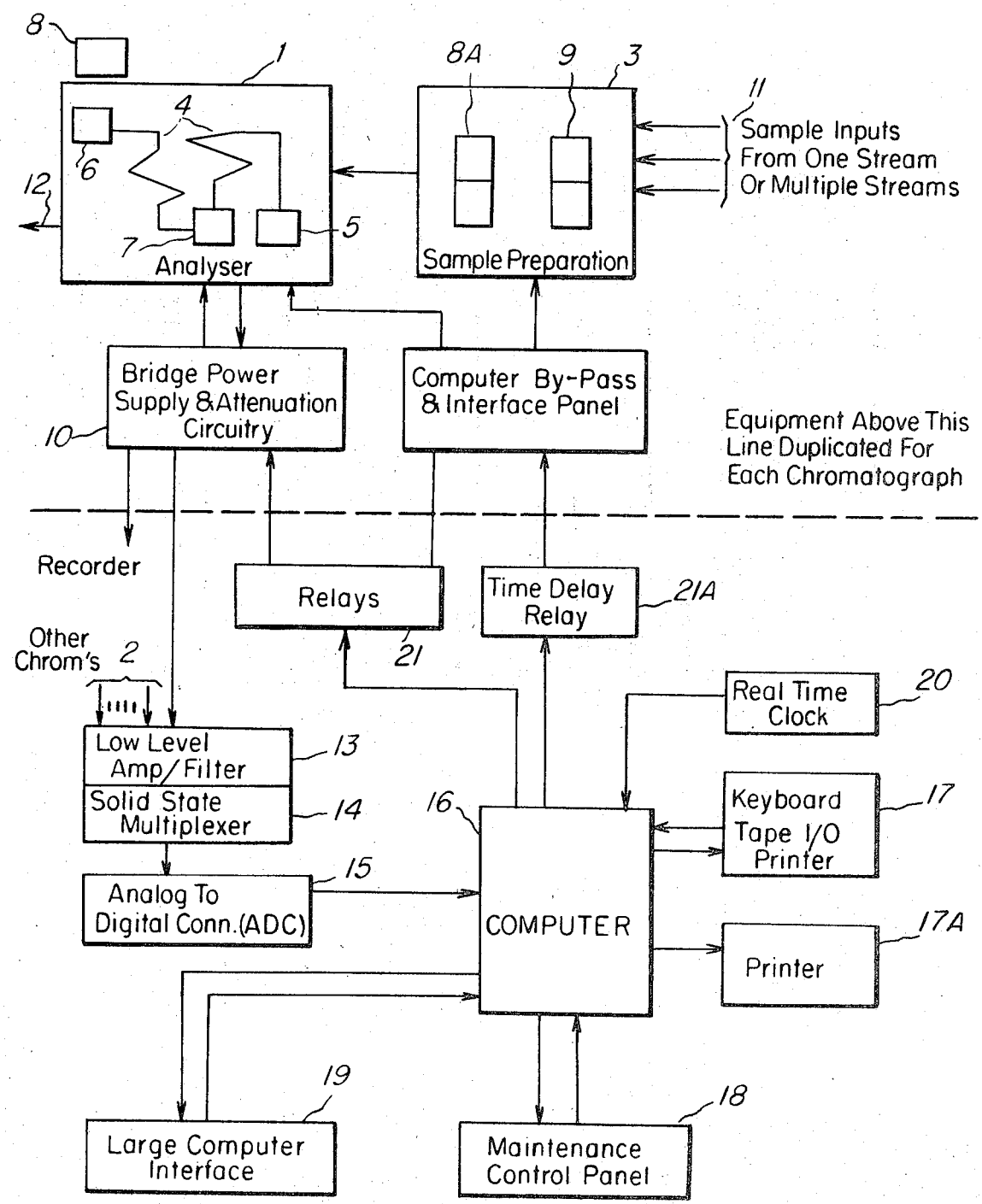

The analyzer 1, and the sample preparation system 3, comprise elements well known in the art. A series of these analyzer and sample preparation systems are represented at 2, where "Other Chrom's" indicate a series of chromatograph systems comprising the equipment shown above the broken line in FIGS. 1 and 2. Their functions are referred to above under the list headed "A Chromatographic Analyzer and Sampling System." Among the elements depicted is the chromatographic column 4 and its detector block 5, sample injection valve 6 and column-switching valve or valves 7. The temperature regulator is shown at 8. The sample preparation system includes stream-switching valve 8A and means 9 for filtering and pressure reducing the sample. The bridge power supply and attenuation circuitry 10 provides power to the bridge detector 5 and provides a means of dynamic attenuation. The bridge power supply is shown with a connection for a recorder. Thus one recorder may be shared with many chromatographs. Samples from process streams are indicated at 11 entering the sample preparation system, then passing to the analyzer system and from there to the sample outlet 12. Signals representative of the sample composition are transmitted to a low level amplifier 13 for each analyzer. This device conditions the bridge signal and transmits it to a multiplexer 14. Means 13 and 14 are commercially available in dual function Redcor 625 subsystem, Redcor Corporation, Canoga Park, California. This system can operate on low level signal sources, ranging from 10—500 millivolts, 0—1,000 ohms, which produces a pulse amplitude modulated output signal which can drive up to 100 milliamp output loads. This system includes a low level differential input amplifier, a high level active filter, a high level solid state multiplexer and an output amplifier. The signal from the multiplexer provides a high speed input to the analogue to digital (ADC) converter 15. The ADC system may be a conventional Redcor Corporation Model 633. This model accepts an analogue input with a range from —10 to +10 volts and converts at a rate of 1.5 microseconds per bit. The control input may be 0 volts ±.5 volts true, and 9 volts ±3 volts false, alternatives are available. Correspondingly, the logical outputs may be 0 volts ±.5 volts true, and 9 volts ±3 volts false. The output register is 14 binary bits plus a sign bit. This output signal is transmitted to the computer 16. The computer is a general purpose high speed, less than 2 microseconds memory cycle, 12—18 bit word length, 4096 word core system. A suitable computer is the PDP–8 manufactured by Digital Equipment Corporation Maynard, Mass., and described in Digital Equipment Corporation's catalog entitled "PDP–8, A High Speed Digital Computer," 1965. The computer accessory system includes an ASR-33 Teletype unit 17 for tape preparation, tape entry, tape output and page printer. An additional teletype unit 17A, an RO35, is included in the system to provide a printout of each analysis as it is generated by the computer. An operator control station 18 is included for entering calibration data, timing data, and for data display. Input/output registers 19 are available for communicating with a larger computer.

A real time clock 20, capable of emitting an interrupt pulse to the computer, enables the program to initiate an analogue to digital conversion at constant intervals of time. This effectively slices the chromatogram into equal increments along the time axis and facilitates an integration technique.

Output signals from the computer are in the form of solid state driver output or relays. Relays 21 are utilized for energizing stream switching valves 8A, sample injection valve 6, and column valve (valves) 7. time delay relay 21A is activated on a periodic basis by the computer program. If the program fails to reset it within its time delay period a contact closure will place all the analyzers in a fail safe condition to provide protection for the chromatograph columns.

Figure 2:
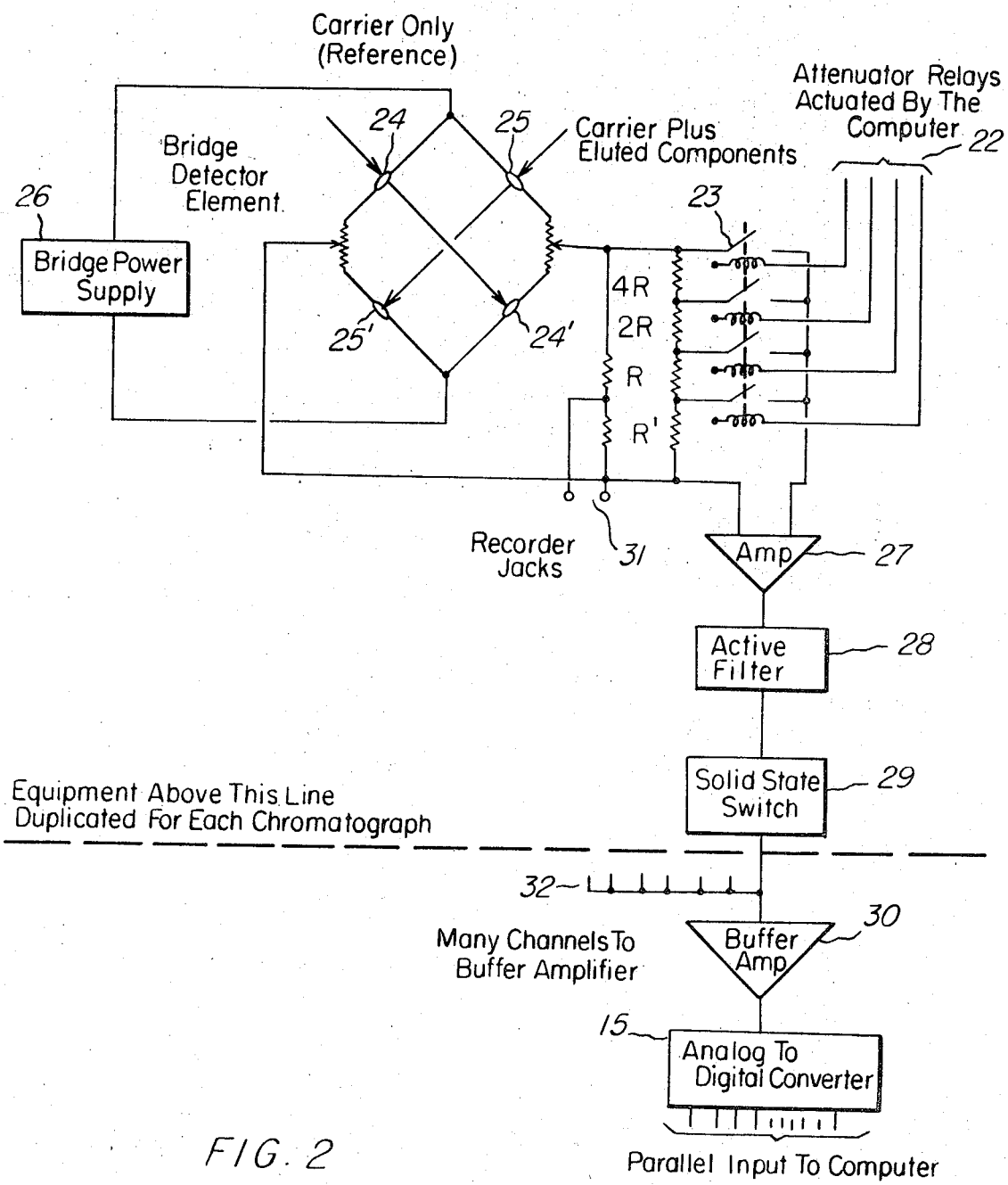
FIG. 2 is an illustration of the attenuator circuit used in this invention.

In FIG. 2 the connections 22 from the computer to the relays 23 are indicated. These relays incorporate resistors 4R, 2R and R into the bridge circuit. The carrier gas is detected at 24 and 24'; carrier gas plus eluted components are detected at 25 and 25'. The bridge power supply 26 actuates these detector elements. A conventional amplifier 27, filter 28, switch 29 and buffer amplifier 30 provide the appropriate circuitry for sending the signal from the bridge to the analogue converter. This signal may be monitored at recorder jacks 31. The presence of a series of such bridge systems is indicated generally at 32.

Relays 22 have a purpose which is of prime importance in conditioning the signal for use by the computer analysis program. The dynamic range of chromatographic detectors very often runs from 0 to 50,000 parts. The A–D converter as given in the example has a range of 16,000 counts (14 binary positions). In order to cover the dynamic range of the detector a dynamic attenuation scheme is built into the detector circuitry and the program. Initially when the program is examining A–D conversions at the chromatogram's baseline, attenuation of the signal is set by the relays at one. When a peak emergence is detected by the program and as the signal rises above, for example, 75 percent of the A–D converter's range, the program switches to the next higher attenuation. The next higher attenuation is always a binary equivalent like 2, 4, etc. When data enters the computer the program remembers the attenuation existent at the time of A–D conversion and shifts the data left the number of binary bits equivalent to the attenuation. A shift left is tantamount to multiplication in binary notation and therefore all data utilized by the computer is at a constant binary point.

Figure 3:
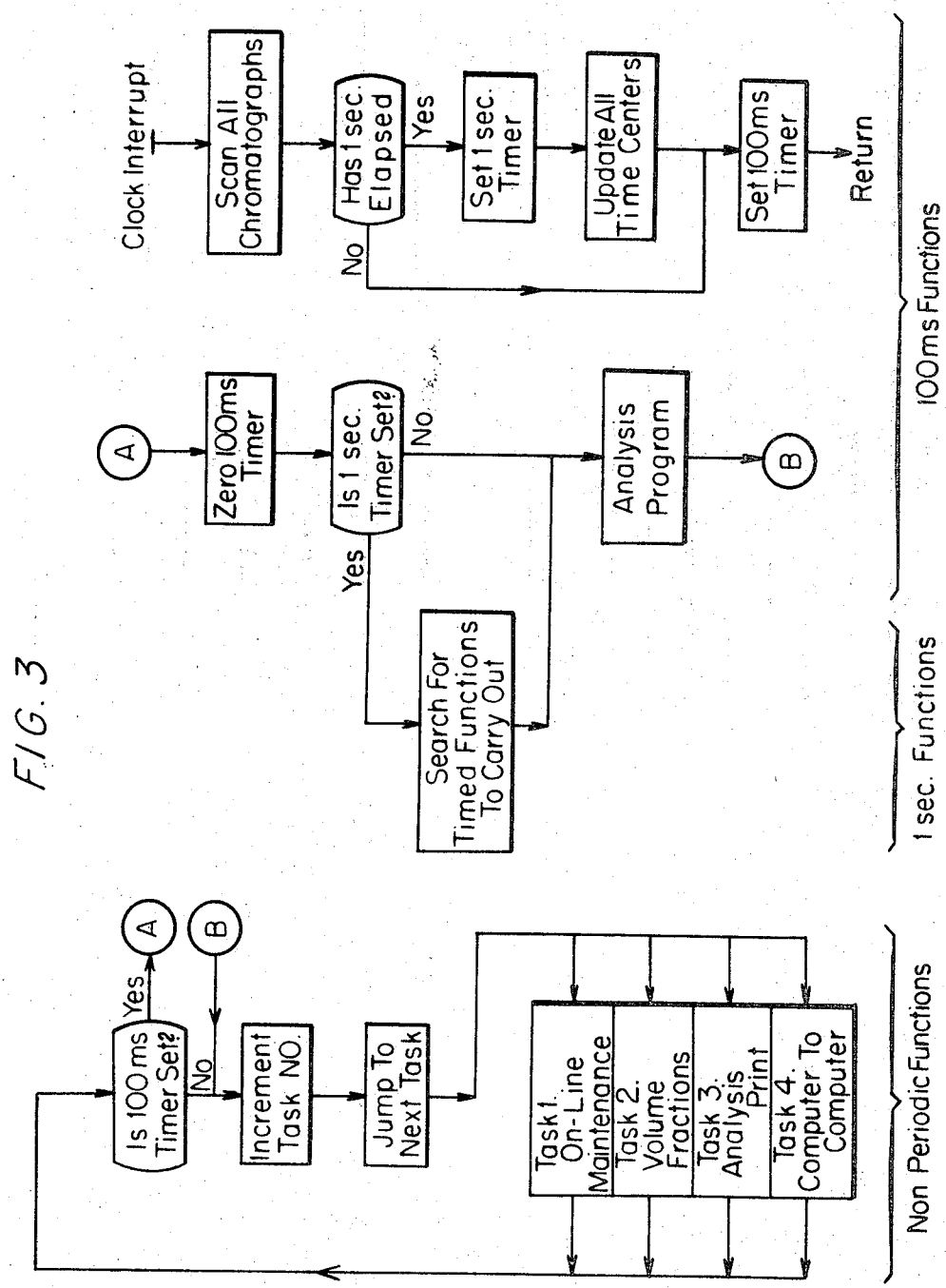
FIG. 3 depicts the overall program flow for this invention.

FIG. 3 depicts the overall program flow. This program is designed to carry out the functions of the computer, which may be broadly classified as control and analysis. Control functions include all the operations which, in a conventional chromatograph system, are controlled by a mechanical timer of some kind; examples are listed above under "Chromatographic Analyzer and Sampling System." Switching of column configurations, turning sample valves on and off, turning stream valves on and off, are all control functions, and will be referred to as "timed functions." Each is an event which occurs at the same time in each cycle of analysis. Also included as timed functions are events which do not affect the valve configurations, but which alter the mode of analysis of the data. For example, a baseline correction would be initiated as a timed function.

One major requirement, is for a method to process and initiate timed functions. In an embodiment of this invention, the timed functions will be initiated by a program entered every second. This system scans a list of timed functions for each chromatograph, searching for a function time equal to the current time for that instrument. The current time is measured from a reference point at the start of the cycle of events. When it finds one, that function is executed, either as a digital output to operate a valve, or as an internal change in the operating mode of the analysis program.

The other basic function of the computer is analysis of the analogue signals from the chromatograph detectors. In this system there is a real-time clock, set to give an interrupt 10 times a second (100 ms.) second. In responding to this interrupt, a program will initiate A-D conversions of all the chromatograph signals and will store away the digitized values. The analysis program is then entered, to examine the latest input value from each instrument, and by making use of a short history of values, determine whether the signal is on a baseline, going up a peak, or going down a peak. The analysis program also integrates the area under each peak and corrects the areas, if necessary, for baseline shift due to column switching.

In addition to the control functions performed once a second, and the analysis functions performed 10 times a second, there are a number of nonperiodic functions to be carried out by the computer. The two categories are end-of-stream functions and online maintenance functions. After a sample has completely passed through the detector of an instrument, programs have to be entered to:

1. Calculate the volume fractions of the components.
2. Print the fractional analysis.
3. Transmit the analysis.
4. Decide which stream to analyze next.

These programs are entered every time a chromatograph completes an analysis, so that, when more than one instrument is considered, execution of the programs is nonperiodic.

The online maintenance program is activated through the keyboard of the ASR–33, and is used to print or change data tables in the system while the computer is still carrying out its basic functions of control and analysis.

In FIG. 3, the nonperiodic programs mentioned above are called "tasks," and the uninterrupted state of the computer is cycling through this list of tasks, examining each one to see if it has anything to do. In the tasks that involve printing or other I-O functions, the programs are written so that no time is wasted waiting for the I-O device. For example, in analysis printing, once the task has come up with a character to print, it gives a print command, saves its place in the program, and exits to carry on with the next task. Next time the analysis print task is entered, it computes the next character to be printed, and if the previous one is completed, it prints the next and exits as before. But if the previous character is not yet completed, it saves the next one before it exits, and will try again on its next entry to the task. In this way the machine is never held up waiting for slow I-O devices when it could be doing something else.

The only time the machine gets out of this closed task list loop is when it is interrupted every 100 ms. by the real-time clock. This is the only interrupt in the system. In the interrupt response, the analogue inputs are scanned, the time-keeping manipulations are carried out, and return is made to the interrupted task, the analysis program is entered, and the machine subsequently resumes cycling through the task list.

To summarize, the computer cycles through the nonperiodic, and less critical, tasks and is interrupted periodically to perform its control and analysis functions. A scan of 15 chromatographs and assimilation of this data for storing at proper scale position uses approximately 10 percent of the computer's time between 100 ms. interrupts. The control and analysis functions of the computer will utilize about 25 percent of the remaining time, leaving 75 percent available for carrying out the nonperiodic functions.

The scan program in the interrupt response reads each analogue signal in turn, via the A-D converter and multiplexer. While waiting for the next signal to be converted, the program examines the attenuation factor associated with the previous signal, and, if necessary, multiplies that signal by the attenuation before storing it. If the magnitude of the signal is over 75 percent of the full-scale output of the A-D converter, a larger attenuation is switched in. Similarly, if the signal is under 25 percent of full scale, a smaller attenuation is switched in. If a maximum attenuation of 8 is used, this allows the effective range of the input signals to be increased by the same factor. Although this automatic attenuation switching uses some of the time between A-D conversions, there will still be some waiting until the conversion is complete. This is, in fact, the only time when the machine will be held up by an I-O device.

The time-keeping functions of the interrupt response are to update each chromatograph's real-time counter every second, and to update the time of day every minute. The time of day is used in most of the printed messages.

The purpose of the analysis program is to measure the area under each of the peaks in each chromatograph's output. To do this it must be able to detect the start of peak, the top of a peak, and the bottom of a peak. It must also be able to measure a baseline, since the area has to be measured between the curve and a baseline. The situation is further complicated by the presence of a negative-going hydrogen peak; by changes in column configuration that produce transients in the signal and changes in the baseline; and by components that do not always separate into clean peaks.

A "mode word" for each chromatograph tells the analysis program which logical path it should take. The modes of analysis are:

1. Start baseline calculation: The program is initialized to measure a baseline value.
2. Compute base: a running average of the signal is kept, and a measure of the maximum noise (change in baseline) is obtained.
3. Terminate baseline calculation: If necessary, corrections are made to peak areas for the change in baseline since they were measured.
4. Test for peak start: When the start of a peak is found, the program begins summing a new peak area and looks for the peak top.
5. Test for peak top: When the top is found the program begins looking for the peak bottom. Also the time of top of peak is saved, to be used for later identification of the component.
6. Test for peak bottom: When the bottom is found, area summing is terminated and the program looks for a new peak.
7. Sum only: The area under the curve is summed, without regard to changes in slope. This mode is used to measure the area of two or more peaks that cannot be effectively separated.
8. Do nothing: The signal is ignored. The do nothing mode is used to eliminate the effect of transients in the signal, produced by column switching.
9. Inactive: Chromatographs not on-stream have a zero mode word.

10. Force bottom of peak: Summing the area is stopped, just as if the peak bottom had been detected, and a fixed delay in the do nothing mode is started. After the delay the "test for start of peak" mode is entered. This mode is used when a transient switching surge occurs right at the peak bottom.

A simple criterion of slope change is insufficient to detect the start, top, and bottom of a peak. It was found that the simple slope change criterion would not work on flat-topped peaks and with high noise levels. The noise had to be smoothed out by some means, and the method that gave the best results uses a smoothed or weighted slope rather than the actual slope.

To define the smoothed slope, suppose the current signal has a value $X_n$. The 5 most recent values, which have been saved by the program, are:

$$X_{n-4}\ X_{n-3}\ X_{n-2}\ X_{n-1}\ X_n$$

If the old smoothed slope is $S_{n-1}$, then the new smoothed slope is defined by:

$$S_n = aS_{n-1} + b(X_n - X_{n-4})$$

After the next scan, the smoothed slope is:

$$S_{n+1} = aS_n + b(X_{n+1} - X_{n-3}),$$

and so on.

The smoothed slope is a value which places more weight on the slope in the past than on the instantaneous slope, which may be largely due to noise. The factors $a$ and $b$ can be varied as needed; suitable values are, $a = ¾, b = ¼$.

The maximum noise is measured by a similar weighting method, so that the criterion for start of peak is merely that the smoothed slope exceeds the maximum noise. The criterion for top and for bottom of peak is that the smoothed slope becomes less than or equal to zero.

A further modification imposed by very flat-topped peaks is that the program does not start looking for the peak bottom until the signal is less than 87.5 percent of the peak top value.

An input channel selection and A–D conversion for each chromatograph signal is made. For each signal, a smoothed slope, or rate of change with respect to time, is calculated. If this smoothed slope is greater than some tolerance value it is assumed a peak is eluting and summations are kept for this component. Each subsequent A—D conversion is summed in a memory cell for this chromatograph until the bottom of the peak is detected. When the top of a peak is detected the elution time of this component, measured from sample inject time, is saved in a memory cell, to be later used to identify the component.

After all the components have eluted, a timed function will turn on the volume fraction calculation task. This task takes each peak in turn and identifies it by matching its elution time, saved at top of peak, with one of the values in a table of ideal elution times for the peaks expected for that stream. With the component identified, the correct thermal coefficient, or $k$ factor, can be located, and this is divided into the area. If the peak is not identifiable an average $k$ factor is used. An unrecognizable component will usually have a small peak area and the $k$ factor used is not as critical in its effect on the magnitudes of the other fractions. This means that unknown components can occur in the sample and still be included in the final analysis. The volume fractions calculated will then be fractions of the whole sample, including unknowns.

When all the peaks have eluted each area is divided by a thermal response coefficient and these quotients are added together. The percent concentration is found by dividing each quotient by the sum of the quotients. This is described by the formula:

$$C_i = \frac{A_i/K_i}{\sum_{1}^{n} A_i/K_i}$$

$C_i$ represents the concentration of the component in the $i^{th}$ peak. $A_i$ is the area the $i^{th}$ peak and $K_i$ is the response coefficient for the component in the $i^{th}$ peak. The response coefficient may be obtained from the literature such as the article by Messner et al. referred to above. The product of the response coefficient and the peak area are summed for the number of peaks, $n$.

The program leaves a list of fractions and a parallel list of component identifier numbers, together with a process unit number and a process stream number. It turns on the process print task and the computer-to-computer task, both of which operate on these lists.

In summary, the basic programs to implement computer control of the chromatograph at each interrupt are: select line and digitize signal for each chromatograph; test each digitized signal against old for determining (a) start of integration, (b) continue integration, (c) stop integration, or (d) do nothing; increment a count for each chromatograph and test for an on/off function that may be required at that time; sum peak areas, compute individual component percentages, and if necessary purge column and initiate new analysis.

In the startup of the chromatographs the computer program will be functioning in the on/off timing mode. A manual switch override on the operator's control panel would be used to bypass each computer digital output. A millivolt recorder would be connected directly to the analyzer bridge or at an attenuator after the low level amplifier. Manual sample inject would be requested and the analysis initiated. A sample test panel of lights would monitor the digital outputs from the computer at the same time. The lights should come on at the same time the manual decision was made to make a switching change. Of course, it is assumed the computer programmed timing was derived from a chromatogram supplied with appropriately marked switching points.

A general program would be provided to allow online updating of the thermal response coefficients and the timed functions, and to allow any chromatograph or stream to be placed under computer control, or removed from computer control.

Thus, an exemplary embodiment has been described for computer control of chromatographs. It will be understood by those skilled in the art that the above-described embodiment is exemplary and that it is susceptible of modification and variation without departing from the spirit and scope of the invention. Accordingly, the invention is not deemed to be limited except as it is defined in the following claims.

I claim:
1. An apparatus comprising:
   at least two chromatographs, each of said chromatographs having a sample injection means and a detector means which provides an analogue output signal representative of the passage of components through the respective chromatographs;
   a digital computer means which provides a signal to actuate said sample injection means to admit stream samples to said chromatographs, and which includes program means for causing said digital computer means to periodically sample the output signals from each of said chromatographs, to store signals representative of the amplitudes of successive sample signals from each of said chromatographs, and to generate a smoothed slope for each output signal from said chromatographs in accordance with:
   $S_n = aS_{n-1} + b(x_n - X_{n-y})$, where
   $S_n$ = current smoothed slope,
   $S_{n-1}$ = preceding smoothed slope,
   $X_n$ = current amplitude signal,
   $X_{n-y}$ = a preceding amplitude signal separated in succession by y, where $y > 1$, and
   $a$ and $b$ = weighting factors, $a > b$
   thereby indicating the weighted slopes of the output signals from said chromatographs; and
   an analogue to digital converter which is operatively connected between said detector means and said digital computer means.

2. The apparatus of claim 1 comprising means to vary the magnitude of said output signal in response to the passage of components through the chromatographs.

3. The apparatus of claim 1 wherein said digital computer means comprises program means for causing said digital computer means to integrate the signals from the respective detector means and to generate a signal representative of the components in each sample stream.

4. The apparatus of claim 3 comprising means to alternatively transmit said analogue output signals from each respective detector means to said analogue to digital converter.

5. The apparatus of claim 1 comprising means to automatically attenuate said analogue output signal in response to a signal from said digital computer.

6. The apparatus of claim 5 wherein said means to attenuate the analogue signal comprises a series of relays which respectively actuate switches to incorporate attenuator resistors in said output signal.

7. The apparatus of claim 1 comprising multiplexing means operatively connected between said computer means and said chromatographs.

8. An apparatus comprising at least two chromatographs each of said chromatographs having a sample injection means and a detector means which provides an analogue output signal representative of the passage of components through the respective chromatographs, a digital computer means which provides a signal to actuate said sample injection means to admit stream samples to said chromatographs, an analogue to digital converter which has an operating range and which is operatively connected between said detector means and said digital computer means, and means operatively connected between said detector means and said converter for automatically attenuating said analogue signal in response to an attenuation signal from said digital computer means whenever said analogue signal exceeds a predetermined percentage of said operating range.

9. The apparatus of claim 8 comprising multiplexing means operatively connected between said digital computer means and said chromatographs.

10. The apparatus of claim 9 which comprises: program means for causing said digital computer means to periodically sample the output signals from each of said chromatographs, to store signals representative of the amplitudes of successive sample signals from each of said chromatographs, and to generate a smoothed slope for each output signal from said chromatographs in accordance with:

$S_n = aS_{n-1} + b(X_n - X_{n-y})$, where
$S_n$ = current smoothed slope,
$S_{n-1}$ = preceding smoothed slope,
$X_n$ = current amplitude signal,
$X_{n-y}$ = a preceding amplitude signal separated in succession by $y$, where $y > 1$, and
$a$ and $b$ = weighting factors, $a > b$ thereby indicating the weighted slopes of the output signals from said chromatographs.

11. The apparatus of claim 8 wherein said digital computer means comprises programming means for causing said digital computer means to integrate the signals from the respective detector means and means to generate a signal representative of the components in each stream sample.

12. The apparatus of claim 11 comprising means to alternatively transmit said analogue output signals from each respective detector means to said analogue to digital converter.

13. The apparatus of claim 8 wherein said attenuating means attenuates said analogue signal by a binary factor $\frac{1}{2^n}$, where $n > 0$.

14. An apparatus comprising at least two chromatographs each of said chromatographs having a sample injection means and a detector means which provides an analogue output signal representative of the passage of components through the respective chromatographs, a digital computer means which provides a signal to actuate said sample injection means to admit stream samples to said chromatographs, an analogue to digital converter which is operatively connected between said detector means and said digital computer means and means responsive to an attenuation signal from said digital computer means for attenuating said analogue signal by a binary factor prior to application of said binary signal to said converter.

15. In a method of processing output signals from a plurality of chromatographs in a digital computer the steps comprising:
generating signals by said computer for controlling application of sample streams to said chromatographs;
generating an analogue signal representative of the passage of components through each of said chromatographs;
attenuating each of said analogue signals by a binary factor $\frac{1}{2^n}$, where $n > 0$, when said analogue signals reach a predetermined amplitude;
converting said attenuated analogue signals to a binary signal;
applying said binary signal to a digital computer; and
processing said binary signal within said computer in accordance with a predetermined algorithm.

16. The method of claim 15 wherein the processing step includes causing said computer to periodically sample the output signals from each of said chromatographs, to store signals representative of the amplitudes of successive sample signals from each of said chromatographs, and to generate a smoothed slope for each output signal from said chromatographs in accordance with:

$S_n = aS_{n-1} + b(X_n - X_{n-y})$, where
$S_n$ = current smoothed slope,
$S_{n-1}$ = preceding smoothed slope,
$X_n$ = current amplitude signal,
$X_{n-y}$ = a preceding amplitude signal separated in succession by $y$, where $y > 1$, and
$a$ and $b$ = weighting factors, $a > b$, to thereby indicate weighted slopes of the signals from said chromatographs.

UNITED STATES PATENT OFFICE
CERTIFICATE OF CORRECTION

Patent No. 3,562,501            Dated February 9, 1971

Inventor(s) Francis C. Mears

It is certified that error appears in the above-identified patent and that said Letters Patent are hereby corrected as shown below:

Column 2, line 61, "received" should read -- is --.
Column 3, line 31, after "some cases" insert -- eliminate --; same line 31, after "due" insert -- to well --.

Signed and sealed this 20th day of July 1971.

(SEAL)
Attest:

EDWARD M. FLETCHER, JR.          WILLIAM E. SCHUYLER, J
Attesting Officer                 Commissioner of Patent